(12) United States Patent
Wang

(10) Patent No.: US 6,655,717 B1
(45) Date of Patent: Dec. 2, 2003

(54) FRAME OF AN ELECTRIC CART

(76) Inventor: Arthur Wang, 3F, No. 5. Alley 37, Lane 322, Wan Ta Road, Taipei (TW)

( * ) Notice: Subject to any disclaimer, the term of this patent is extended or adjusted under 35 U.S.C. 154(b) by 0 days.

(21) Appl. No.: 10/160,259

(22) Filed: Jun. 4, 2002

(51) Int. Cl.[7] .................... B62D 21/00; B60K 1/00
(52) U.S. Cl. .................. 280/781; 180/65.1; 180/311; 180/907; 180/908
(58) Field of Search .................. 280/781; 180/907, 180/311, 312, 65.1, 908

(56) References Cited

U.S. PATENT DOCUMENTS

| | | | | |
|---|---|---|---|---|
| 4,633,962 A | * | 1/1987 | Cox et al. | 180/65.1 |
| 4,947,955 A | * | 8/1990 | Hopely, Jr. | 180/216 |
| 5,036,938 A | * | 8/1991 | Blount et al. | 180/208 |
| 5,145,020 A | * | 9/1992 | Quintile et al. | 180/65.1 |
| 5,312,126 A | * | 5/1994 | Shortt et al. | 280/287 |
| 5,518,081 A | * | 5/1996 | Thibodeau | 180/210 |
| 5,941,327 A | * | 8/1999 | Wu | 180/65.1 |
| 6,056,077 A | * | 5/2000 | Kobayashi | 180/216 |
| 6,170,592 B1 | * | 1/2001 | Wu | 180/208 |
| 6,439,331 B1 | * | 8/2002 | Fan | 180/208 |
| 6,565,105 B2 | * | 5/2003 | Lin | 280/124.113 |

* cited by examiner

*Primary Examiner*—Charles T. Jordan
*Assistant Examiner*—John W Zerr
(74) *Attorney, Agent, or Firm*—Rosenberg, Klein & Lee

(57) ABSTRACT

A frame of an electric cart includes a front part, and a rear part. A head tube, a seat support, a securing combination, and front wheels are disposed at the front part. Rear wheels are disposed the rear ends of the rear part. Shock absorbers are connected to the rear part at lower ends. The rear part is connected to the front part with the front ends being pivoted to pivotal members formed at intermediate portions of the lateral sides of the base, and with upper ends of the shock absorbers being connected to the securing combination. The pivotal members are arranged nearer the front of the front part than the seat support so that distance from the rear wheels to the pivotal members is increased, thus helping reduce a range within which the rear part will vibrate when the cart moves along an uneven surface.

6 Claims, 6 Drawing Sheets

`US 6,655,717 B1`

FRAME OF AN ELECTRIC CART

BACKGROUND OF THE INVENTION

The present invention relates to an electric cart, and more particularly an electric cart, of which the frame is constructed such that the rear wheels will vibrate within reduced range when the cart is moving along an uneven ground.

Referring to FIGS. 4 and 5, a frame of a conventional electric cart includes a front part 10, and a rear part 20. The front part 10 has a base, a seat support rod 101, two bent support rods 104, and a head tube 105; the bent support rods 104 are fixed to the front of the base; the head tube 105 is fixedly connected to the bent rods 104 at a lower end, and connected to a handle bar of the cart at an upper end; front wheels 106 are fitted to two sides of the front end of the base; the seat support rod 101 sticks upright form an rear end of the base with bent supplement rods 1011 helping same secured in position that are connected to lateral sides of the rod 101 as well as edges of the base. A seat 102 is connected to the upper end of the support rod 101. The front part 10 further has a pair of holed pivotal portions 103 at two lateral sides of the rear portion of the base. The rear part 20 has rear wheels 201 fitted to two lateral sides of a rear portion of a base 203 thereof; each of the wheels 201 is provided with a shock absorber 202. The rear part 20 is fitted to the front part 10 with an upper front portion being fixed to the rod 101, and with a front portion of the base 203 being pivoted to the pivotal portions 103. Thus, referring to FIG. 6, the shock absorber 202 can help reduce discomfort of the rider when the cart is ridden along an uneven ground.

However, the cart is found to have disadvantages as followings:

1. Because the pivotal portions 103 are formed at the rear end of the front part 10 exactly beside the seat support rod 101, the distance H1 from the pivotal portions 103 to the hubs of the corresponding wheels 201 is relatively short. Consequently, when one rides the cart on an uneven ground, the rear wheels 201 are prone to vibrate up and down for such a long distance that the rider would feel very uncomfortable.
2. The head tube 105 is only held in position with two rods 104. therefore the position thereof is prone to change when it hits objects, causing injure of the rider. And, the bent support rods 104 are in no position to protect the lower portions of the legs of the rider due to the position and shape thereof.
3. The seat support rod 101 is provided with the supplement rods 1011 that can only prevent it from moving sideways, therefore it is not held in position ideally, i.e. at all of the sides.

SUMMARY OF THE INVENTION

Therefore, it is a main object of the present invention to provide an electric cart, which is constricted such that the rear wheels will vibrate within relatively small range when the cart is moving along an uneven ground.

It is another object of the present invention to provide an electric cart, which has a front section capable of protecting the lower portions of the rider's legs if the cart collides with other objects.

It is yet another object of the present invention to provide an electric cart, which is constructed such that a support rod for the seat is held in position with increased firmness.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
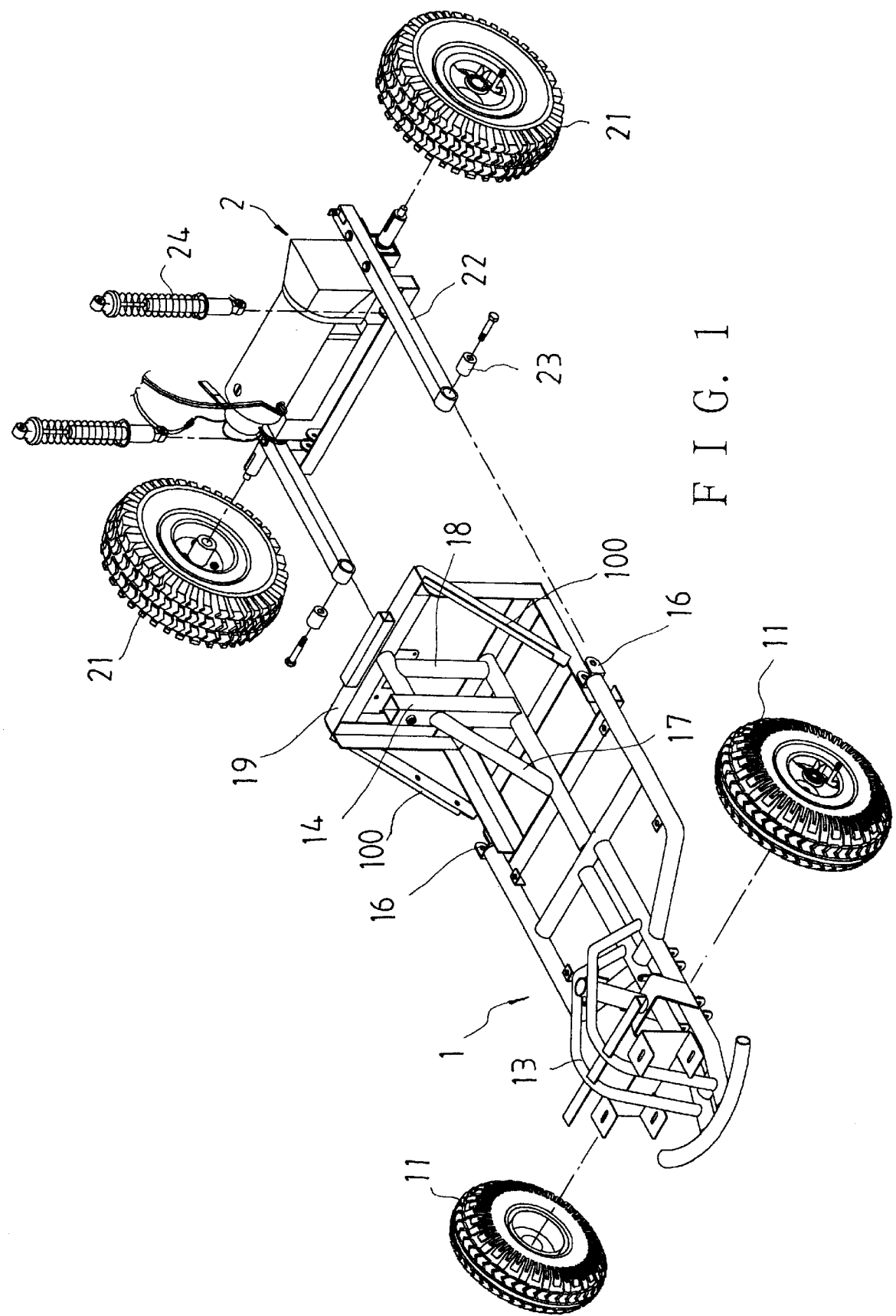
FIG. 1 is an exploded perspective view of the frame of the electric cart according to the present invention.
Figure 2:
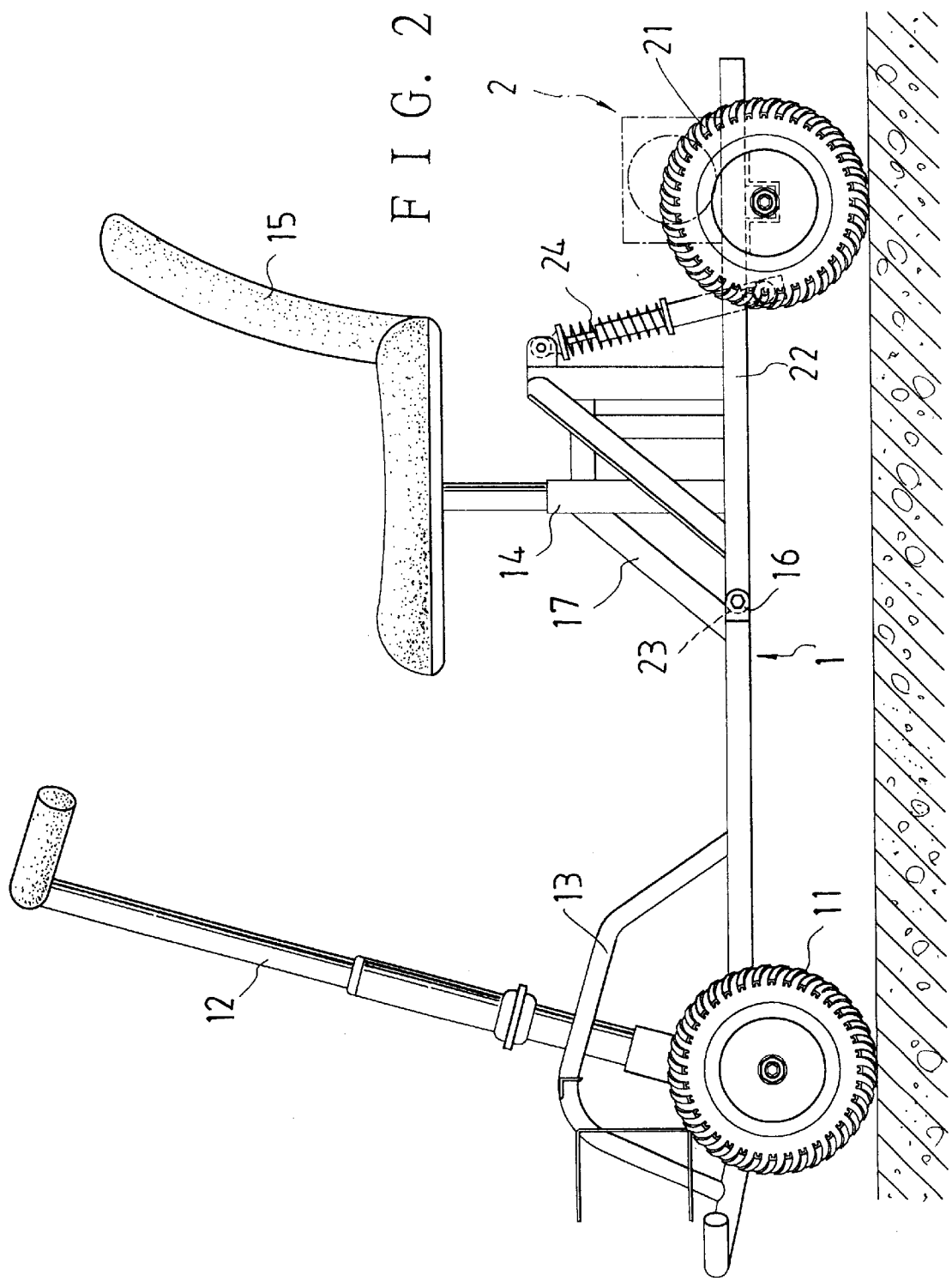
FIG. 2 is a side view of the frame of the electric cart according to the present invention.

Referring to FIGS. 1 and 2, a frame of an electric cart according to the present invention includes a front part 1, and a rear part 2.

The front part 1 has a base, a head tube 12, a seat support rod 14 supporting seat 105, and a securing combination, which includes an inverted U shaped member 19, a T shaped member 18, two tilted support rods 100, and a tilted tube 17. The base of the front part 1 has holed pivotal members 16 at intermediate portions of the lateral sides thereof. Front wheels 11 are fitted to front portions of lateral sides of the base. The seat support rod 14 is fixedly connected to the middle of the rear end of the base at a lower end.

The inverted U shaped member 19 is connected to the base at lower ends. The T shaped member 18 is connected to the base at a lower end, and are joined to a middle of the inverted member 19, and a rear side of the seat rod 14 at two ends of an upper section thereof. The tilted rods 100 are connected to the inverted U shaped member 19, and the base at two ends thereof. The tilted tube 17 is joined to a front side of the seat rod 14, and the base at two ends thereof. Thus, the seat support rod 14 can be firmly held in position with the securing combination counteracting external force of all directions against the same.

Furthermore, a pair of bent supplement rods 13 are connected to the front portion of the base at two ends, and are connected to a respective one of the lateral sides of the head tube 12 at intermediate portions thereof such that the head tube 12 can be secured in position with increased firmness, and the front part 1 is strengthened. And, intermediate sections of the bent supplement rods 13 are formed with an increased height so as to be a protection against collision for lower portions of the rider's legs.

Rear wheels 21 are fitted to rear end portions of two lateral rods 22 of the rear part, and shock absorbers 24 are connected to the rear part 2 at lower ends thereof. The rear part 2 is connected to the front part 1 with the front ends of the lateral rods 22 being pivoted to the pivotal members 16, and with upper ends of the shock absorbers 24 being connected to the securing combination. Sleeves 23 are fitted to the joints between the pivotal members 16 and the front ends of the lateral rods 22 of the rear part 2 such that the joints are strengthened, and noise of the lateral rods 22 pivoting on the pivotal members 16 can be reduced. In addition, the lateral rods 23, and the pivotal members 16 are more hard-wearing due to the sleeves 23.

Figure 3:
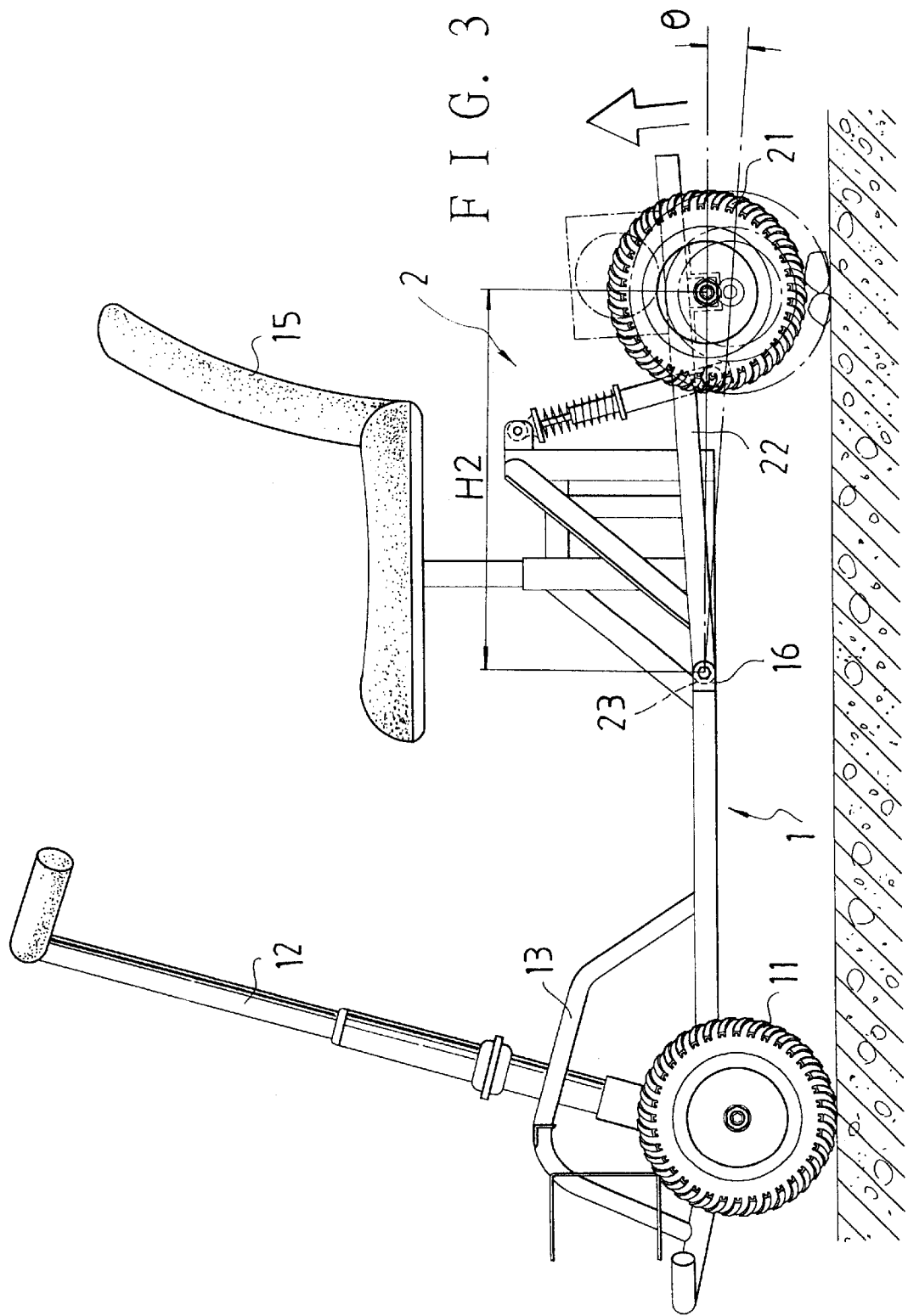
FIG. 3 is a side view of the frame of the electric cart of the present invention being moved along an uneven ground.
Figure 4:
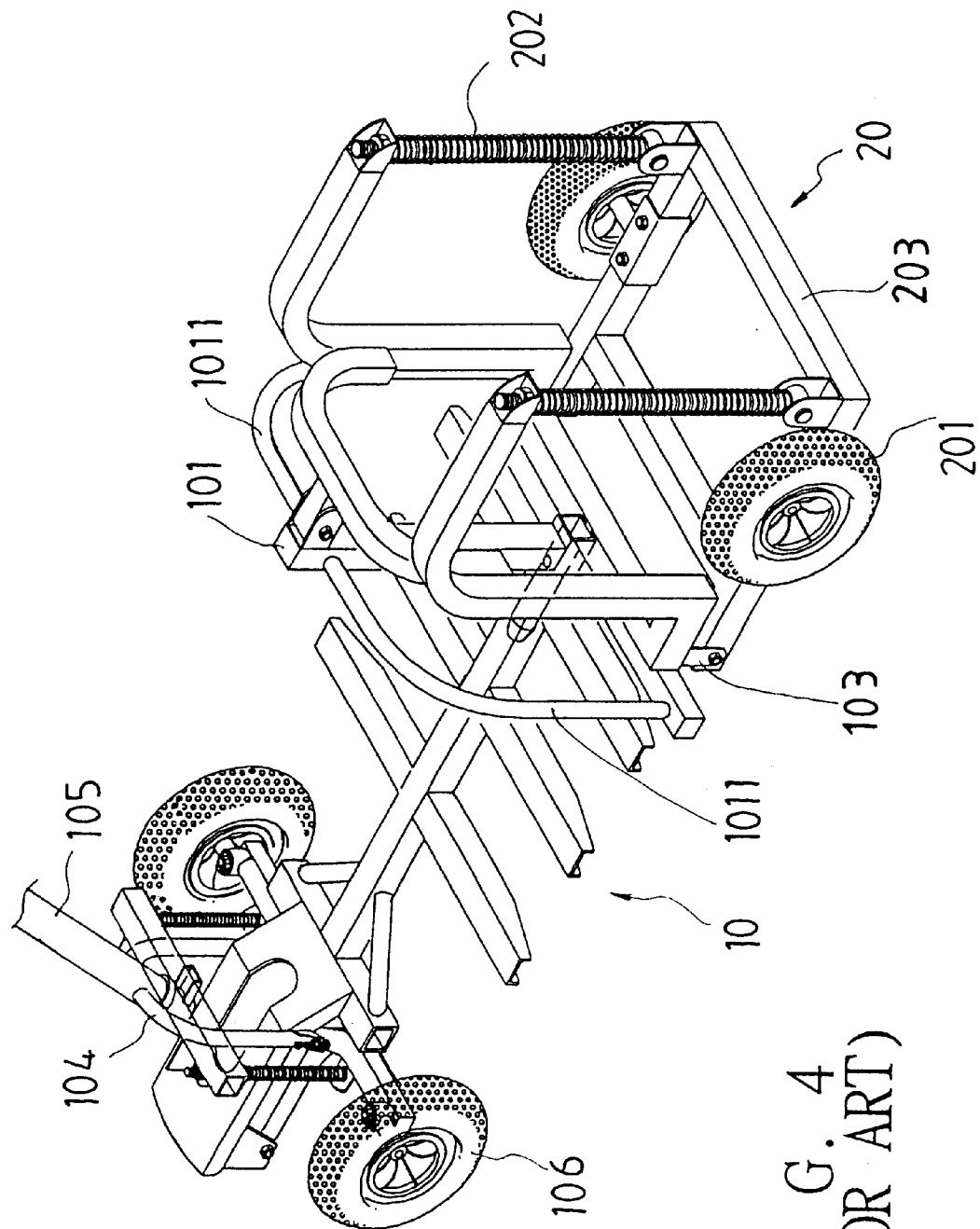
FIG. 4 a perspective view of the frame of the conventional electric cart in the Background.
Figure 5:
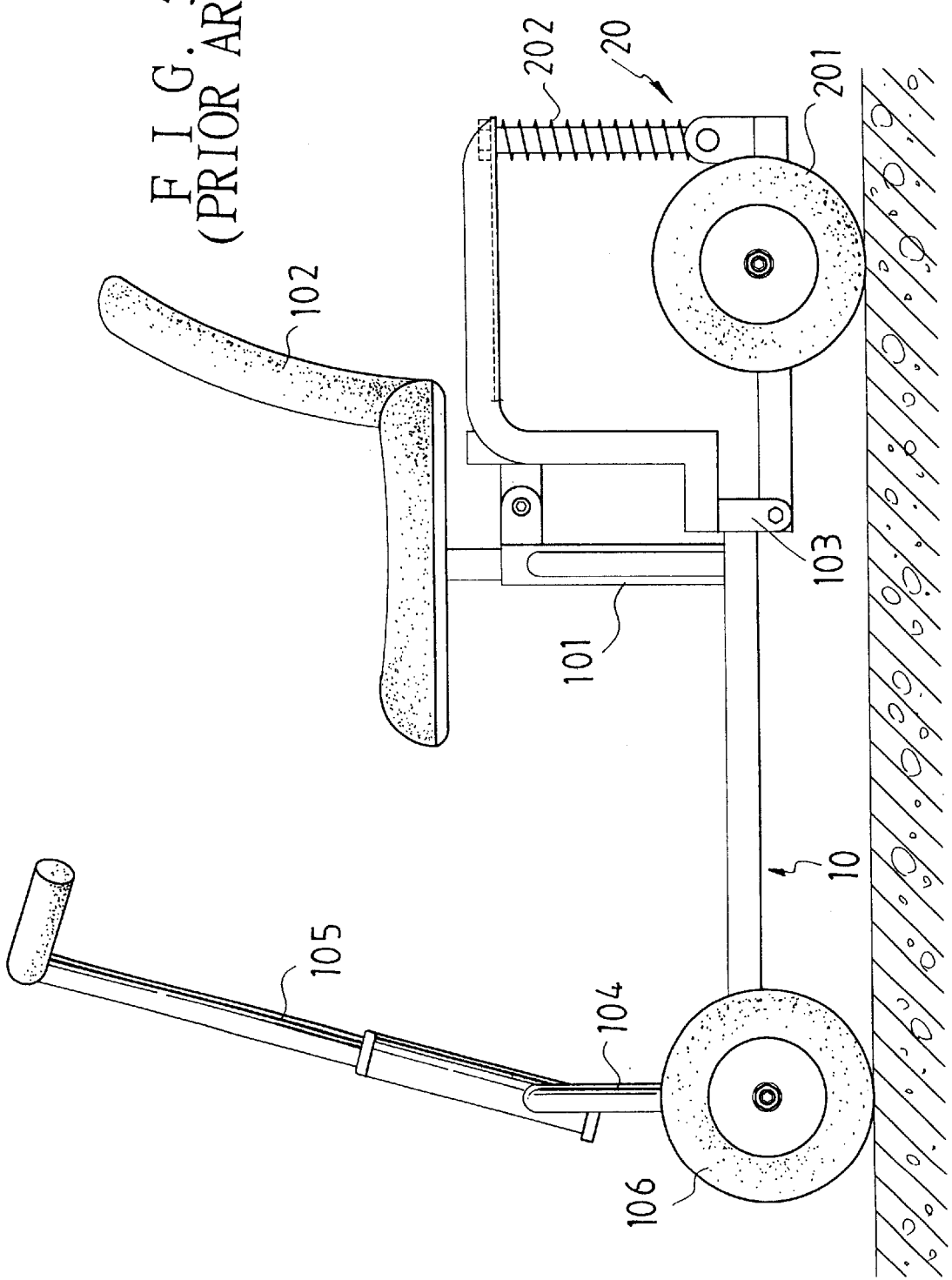
FIG. 5 is a side view of the frame of the conventional electric cart.
Figure 6:
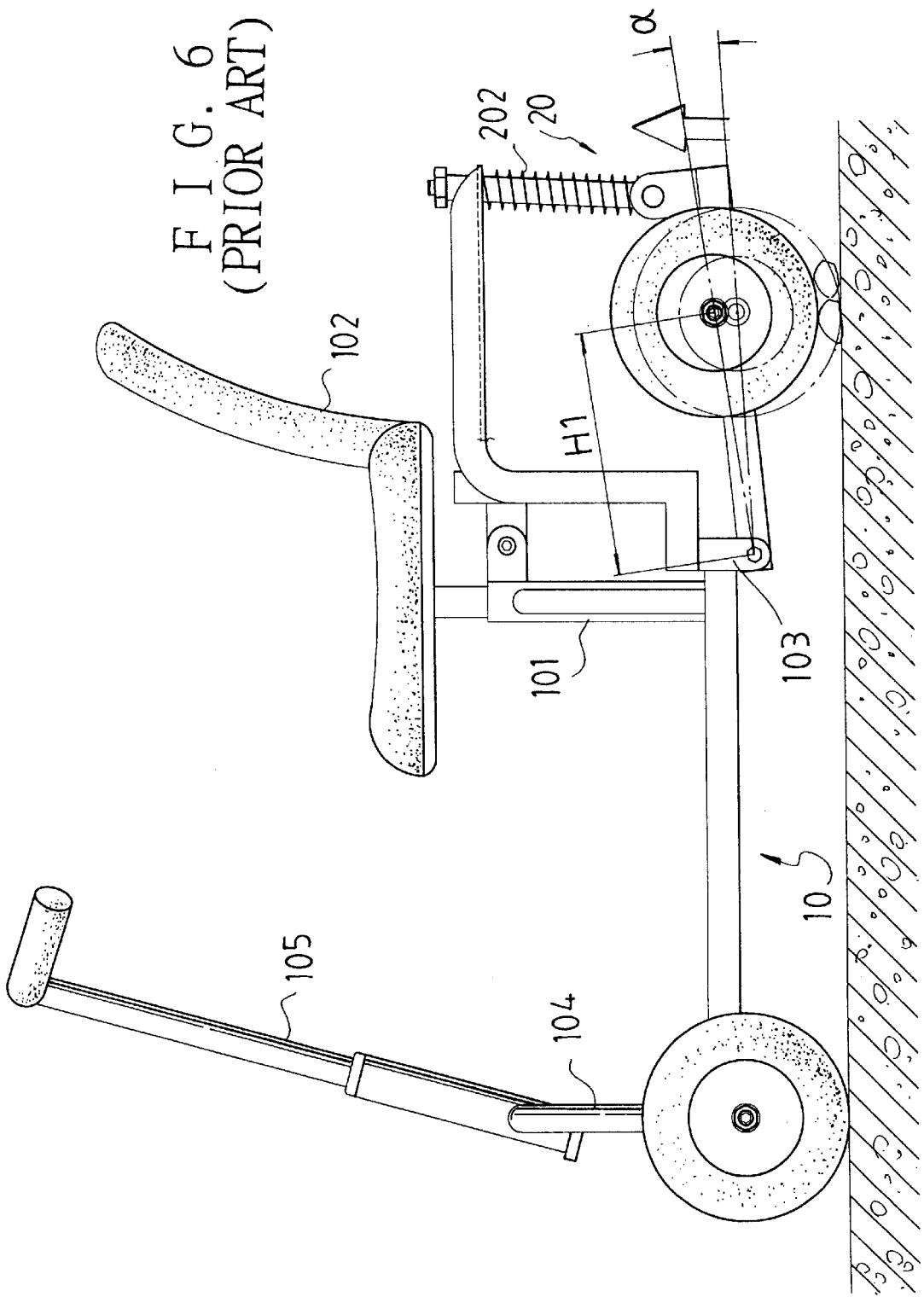
FIG. 6 is a side view of the frame of the conventional electric cart being moved along an uneven ground.

Referring to FIG. 3, when the cart of the present invention, and the conventional cart in the Background are moved along an uneven ground, the rear part 2 will vibrate within a smaller range θ than that 20 of the conventional cart range ∝ because the distance H2 from the pivotal members 16 to the hubs of the corresponding wheels 21 is longer than that H1 of the conventional cart. Therefore, the change of position of the pivotal members 16 in relation to the seat rod 14 helps reduce the range within which the rear part 2 will vibrate when the cart moves along an uneven surface.

From the above description, it can be seen that the cart frame of the present invention has advantages as followings:

1. The rear part will vibrate within relatively small range when the cart is moving along an uneven ground, thus not causing discomfort of the rider.
2. The front section of the frame is strengthened, and can protect the lower portions of the rider's legs if the cart collides with an object.
3. The seat support rod is held in position with increased firmness.

What is claimed is:

1. A frame of an electric cart, comprising a front part having a base, a head tube, a seat support rod, and a securing combination; front wheels being fitted to front portions of lateral sides of the base; the head tube, and the seat support rod being connected to the front portion, and a rear portion of the base respectively; the securing combination being connected to both the base and the seat support rod for holding the rod in position;

a rear part having rear wheels fitted to rear end portions of two lateral rods thereof; shock absorbers being connected to the rear part at lower ends; the rear part being connected to the front part with front ends of the lateral rods being pivoted to pivotal members formed at intermediate portions of the lateral sides of the base, and with upper ends of the shock absorbers being connected to the securing combination; the pivotal members being arranged closer to the front of the front part than the seat support rod to allow the rear wheels an increased distance from same to corresponding ones of the pivotal members, thus helping reduce a range within which the rear part will vibrate when the cart moves along an uneven surface.

2. The frame of an electric cart of claim 1, wherein a pair of bent supplement rods are connected to the base at two ends, and are connected to a respective one of lateral sides of the head tube at intermediate portions for helping the head tube secured in position and for strengthening the front part.

3. The frame of an electric cart of claim 2, wherein the bent supplement rods are provided with such a height and shape as to be a protection against collision for lower portions of legs of a rider.

4. The frame of an electric cart of claim 1, wherein sleeves are fitted to the joints between the pivotal members and the front ends of the lateral rods of the rear part.

5. The frame of an electric cart of claim 1, wherein the securing combination is constructed so as to be capable of counteracting an external force from all directions against the seat support rod, thus helping the seat support rod held in position firmly.

6. The frame of an electric cart of claim 5, wherein the securing combination includes an inverted U shaped member, a T shaped member, two tilted rods, and a tilted tube; the inverted U shaped member being connected to the base at lower ends the T shaped member being connected to the base at a lower end, and connected to a middle portion of the inverted member and a rear side of the seat rod at two ends of an upper section thereof; the tilted rods being connected to the inverted member, and the base at two ends thereof; the tilted tube being connected to a front side of the seat rod, and the base at two ends thereof.

* * * * *